(12) United States Patent
Anscher

(10) Patent No.: US 6,962,470 B2
(45) Date of Patent: Nov. 8, 2005

(54) ROD CLIP

(76) Inventor: Joseph Anscher, 1928 Midlane, Muttontown, NY (US) 11791

( * ) Notice: Subject to any disclaimer, the term of this patent is extended or adjusted under 35 U.S.C. 154(b) by 0 days.

(21) Appl. No.: 10/768,763

(22) Filed: Jan. 30, 2004

(65) Prior Publication Data
US 2004/0218973 A1 Nov. 4, 2004

Related U.S. Application Data

(63) Continuation-in-part of application No. 10/187,663, filed on Jul. 2, 2002.

(51) Int. Cl.[7] .............................................. F16B 37/08
(52) U.S. Cl. ...................... 411/433; 411/510; 411/540
(58) Field of Search ................... 403/300, 301, 403/302, 307, 310, 313, 340, 299, 348, 349, 326, 328, 329; 411/433, 437, 508, 509, 510, 540, 913

(56) References Cited

U.S. PATENT DOCUMENTS

| | | |
|---|---|---|
| 1,450,014 A | 3/1923 | Berglof |
| 4,086,679 A | 5/1978 | Butler |
| 5,039,266 A | 8/1991 | Nagayoshi et al. |
| 5,178,479 A | 1/1993 | Brown et al. |
| 5,651,652 A | 7/1997 | Williams et al. |
| 5,779,418 A | 7/1998 | Ying-Che |
| 6,053,458 A | 4/2000 | Meyer |
| 6,514,027 B1 | 2/2003 | Yiu et al. |
| 6,533,487 B2 | 3/2003 | Clark |
| 6,595,226 B2 * | 7/2003 | Uemura ........................ 135/75 |
| 6,602,016 B2 | 8/2003 | Eckart et al. |

FOREIGN PATENT DOCUMENTS

WO    WO00/49254    8/2000

* cited by examiner

Primary Examiner—Gary S. Hartmann
(74) Attorney, Agent, or Firm—Collard & Roe, P.C.

(57) ABSTRACT

A rod clip for connecting a rod to a lever comprises a first portion and a second portion hinged to the first portion. The first portion has a top surface having a recess for receiving a rod, such that folding the second portion over the first portion forms a channel for retaining the rod. There are rod retaining tabs disposed above the channel for retaining the rod in the channel until the second portion can be snapped over the first portion. There is a lock for locking the first portion to the second portion after the second portion is folded over the first portion. There is a lever retaining device disposed on one of the two portions. The hinge is formed by apertures on sides of one of the portions and corresponding protrusions on the other. The protrusions extend into the apertures to allow pivoting of the first and second portions with respect to each other.

10 Claims, 4 Drawing Sheets

ROD CLIP

CROSS-REFERENCE TO RELATED APPLICATIONS

This is a continuation-in part of U.S. patent application Ser. No. 10/187,663, filed on Jul. 2, 2002, the disclosure of which is herein incorporated by reference.

BACKGROUND OF THE INVENTION

1. Field of the Invention

This invention relates to a clip for connecting a rod to an actuating lever. In particular, the invention relates to a durable clip that connects the end of a rod to a lever for operating accessories in motor vehicles.

2. The Prior Art

It is well known in the automotive industry to use rod clips to connect actuating rods to levers. This type of arrangement is especially common with door locking mechanisms and carburetor linkage arrangements. The clips are typically made of a plastic material and snap around the end of the rod. The lever is then snapped into a protrusion on the clip having a retaining lip or latches on its sides.

One typical clip is shown in U.S. Pat. No. 5,178,479 to Brown et al. This clip has a c-shaped rod-retaining part which snaps around the end of the rod. The latch then snaps into the protrusion.

Another device used by Ford Motor Company comprises a two-piece clip having two sides that fold to enclose the rod and a pivoting second piece that snaps over the folded sides. The rod-enclosing portion of the clip is threaded to securely retain the clip and to allow for fine adjustments of the rod after the clip is attached. This clip is durable and works well to retain the rod and lever, but is expensive to produce and time-consuming to assemble. Another clip used in the automotive industry comprises a one-piece clip where the two sides of the clip fold over and snap around the rod. The sides of the clip are threaded to retain the rod. This clip has the drawback that the hinge connecting the two sides of the clip often breaks.

SUMMARY OF THE INVENTION

It is therefore an object of the present invention to provide a rod clip that is durable, securely retains the rod and lever, allows for adjustments of the rod, is inexpensive to produce and requires no assembly.

It is another object of the invention to provide a clip that can be installed with one hand.

These and other objects of the invention are accomplished by a rod clip comprising a first portion and a second portion hinged to the first portion. The first portion has a top surface with a recess for retaining a rod, and a lever retaining device. The second portion also has a top surface having a recess for receiving the rod, such that folding the second portion over the first portion forms a channel for retaining the rod. The recesses in the first and second portions are threaded to interact with threads on the rod to securely retain the rod in the clip. The threads also allow for fine position adjustments of the rod.

On each end of the recess on the first portion, there are rod-retaining tabs, for securely retaining the rod in the first portion until the second portion can be snapped over the first portion. These tabs extend into the space above the threaded portion, and create a C-shaped opening, on each end of the recess. The C-shape acts to retain the rod in place, even before the top portion is snapped over the bottom portion. Alternatively, the tabs could be constructed to have bumps on their ends which act to retain the rod. Furthermore, the tabs could be located in the center of the threaded portion, rather than on the ends. The tabs are slightly resilient, which allows the rod to be snapped in over the tabs. This feature allows the clip and rod to be installed with a single hand. This is important because as the factory assembler installs the rod, they need to reach into the door of the automobile, usually with one hand. So they wish to snap the rod in to the clip and they want it to stay there until they have a chance to close the lid. With the present invention, the rod can be snapped into the clip and retained there until the clip is locked. In prior clips, the installer had to hold the rod in place with one hand prior to locking of the clip.

There is a lock for locking the first portion to the second portion after the second portion is folded over the first portion. The lock preferably comprises a latch on one of the portions and a recess on the other of the portions. The latch snaps into the recess to lock the clip to the rod. The clip can be unlocked by prying the portions apart to force the latch out of the recess.

The first portion and second portion are in two separate pieces. The hinge is formed by apertures on sides of one of the portions and corresponding protrusions on the other portion. The protrusions extend into the apertures to allow pivoting of the first and second portions with respect to each other. The first and second portions are formed in a single injection molding process, even though they are made of two separate pieces. This way, the clip is molded in its fully assembled condition, making it easier for the purchaser to use. The clip is very durable and can withstand repeated pivoting movements because no thin, weak sections are made to form the hinge.

The lever retaining device is preferably a protrusion extending down from the bottom surface of one of the first and second portions. The protrusion is equipped with latches to engage a lever when the lever is snapped on to the lever retaining device.

In another embodiment, the protrusion of the lever retaining device has two outwardly extending curved wings that engage a lever when the lever is snapped on to the lever retaining device.

In yet another embodiment, the lever retaining device is formed by an extension of one of the first and second portions. The extension comprises a first leg, a second leg pivotally and integrally connected to the first leg and an end section. The end section contains part of the recess on the respective first or second portion, such that folding the second leg over the first leg forms the lever retaining device and causes the end section to abut the top surface of the respective first or second portion to complete the recess. The lever retaining device of this embodiment also has latches to engage a lever. In this embodiment, only one of the clip portions is recessed to receive the rod. The other portion snaps over the top of the recess to retain the rod.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
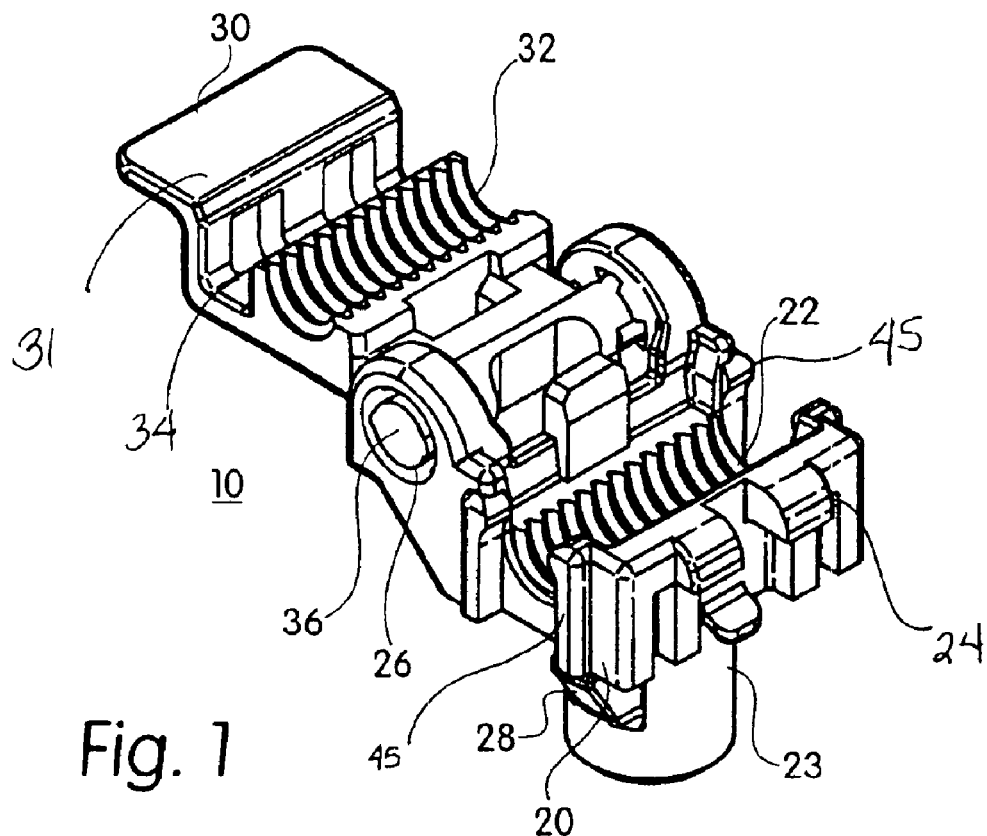
FIG. 1 shows a perspective view of a preferred embodiment of the rod clip according to the invention in an open position.
Figure 2:
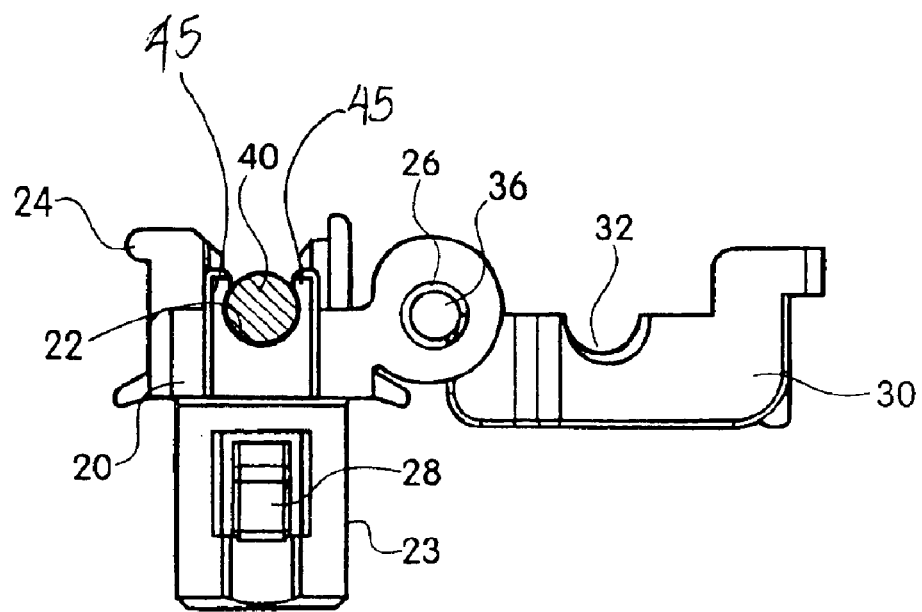
FIG. 2 shows a side view of the rod clip of FIG. 1 in an open position with a rod installed.
Figure 3:
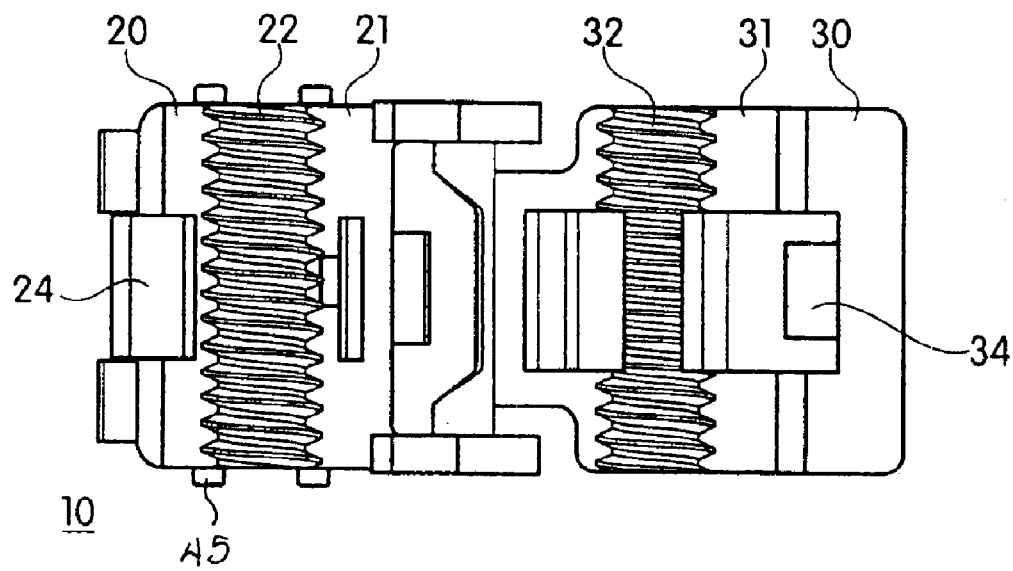
FIG. 3 shows a top view of the rod clip of FIG. 1.
Figure 4:
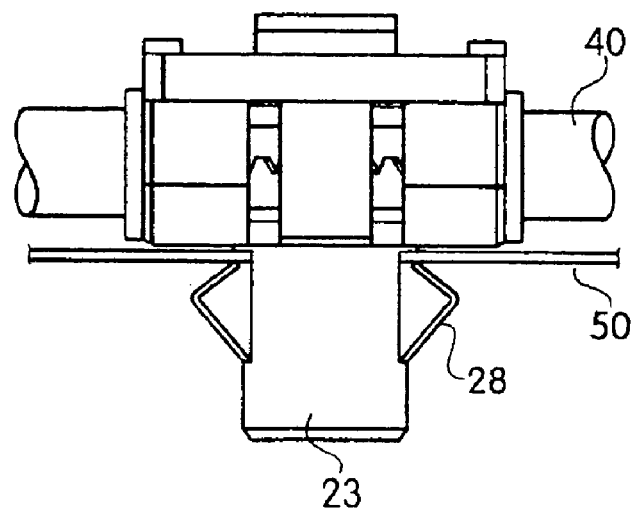
FIG. 4 shows a side view of the rod clip of FIG. 1, in a locked position with a rod attached thereto.

Referring now in detail to the drawings and, in particular, FIGS. 1–4 show a preferred embodiment of the rod clip 10 according to the invention, comprising a first portion 20 and a second portion 30 hinged to first portion 20. First portion 20 has a top surface 21 with a threaded recess 22 for retaining a rod. Lever retaining device 23 is disposed on the underside of first portion 20 and has a plurality of catches 28 for retaining a lever 50, which is snapped on to lever retaining device 23, as shown in FIG. 4. Second portion 30 has a top side 31 having a threaded recess 32 for receiving a rod, such that folding second portion 30 over first portion 20 forms a channel for retaining the rod 40, shown in FIG. 4. The recesses 22,32 in top and bottom portions 20, 30, respectively, are threaded to interact with threads on the rod to securely retain rod 40 in clip 10. The threads also allow for fine position adjustments of rod 40.

The bottom portion 20 contains a plurality of rod-retaining tabs 45, disposed at the ends of recess 22. Rod-retaining tabs 45 act to retain rod 40 securely within recess 22 until top portion 30 can be snapped over bottom portion 20. Rod retaining tabs 45 create a somewhat C-shaped opening that prevents rod 40 from moving out of place once it has been snapped into recess 20 over tabs 45. In an alternative embodiment, the tabs can be formed from straight elements having a bump on their ends, with the bump acting to restrain the rod from leaving the recess. In another embodiment (not shown), the tabs can be located in a central portion of the recess. Other variations of the rod retaining tabs could also be used.

There is a lock for locking first portion 20 to second portion 30 after second portion 30 is folded over first portion 20. The lock preferably comprises a latch 24 on first portion 20 and a recess 34 on second portion 30, or vice versa. Latch 24 snaps into recess 34 to lock the clip 10 to the rod 40. Clip 10 can be unlocked by prying the edge of second portion 30 upwards to remove latch 24 from recess 34.

First portion 20 and second portion 30 are in two separate pieces. The hinge is formed by apertures 26 on the sides of first portion 20 and corresponding protrusions 36 on the sides of second portion 30, or vice versa. Protrusions 36 extend into apertures 26 to allow pivoting of the first and second portions 20, 30 with respect to each other. The first and second portions 20, 30 are formed in a single injection molding process, but result in two separate pieces. This way, clip 10 is molded in its fully assembled condition, making it easier for the purchaser to use. In a preferred embodiment, there is a fragile member connecting the first portion to the second portion in an area of the hinge, to prevent movement of the pieces during shipping. Rotating the first portion in relation to the second portion severs this member so that the two portions remain separate during use.

The protrusions 36 can be of any shape or design, including round, hexagonal, etc. A polygonal shape is preferred because it creates some resistance to rotation of the hinge and makes a tighter fit. Alternatively, detents can be present on the internal surface of the apertures to again create additional resistance to the rotation of the hinge.

Figure 5:
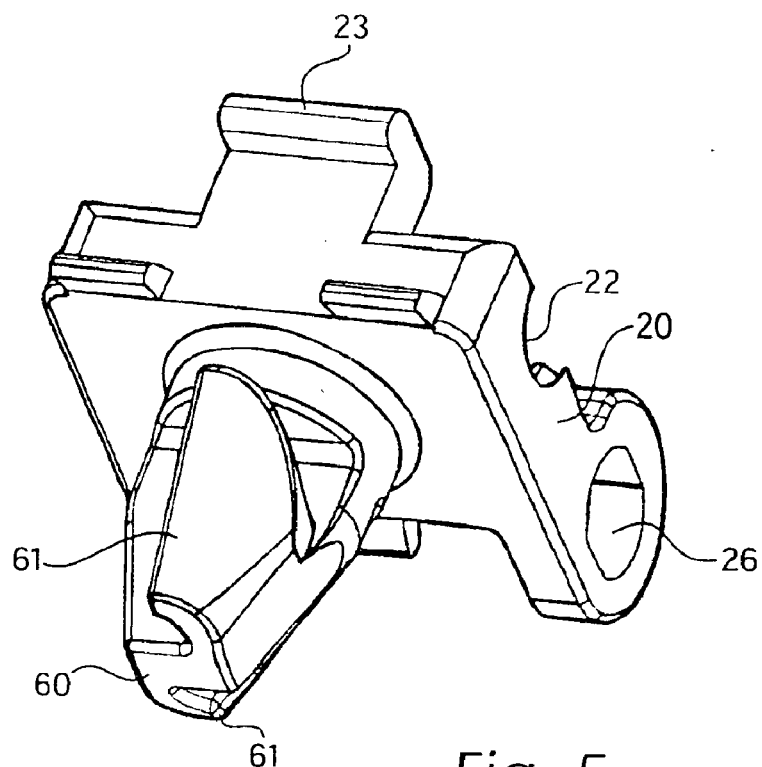
FIG. 5 shows a perspective view of another embodiment according to the invention.

FIG. 5 shows another embodiment of first portion 20 of the invention. Here, lever retaining device 60 comprises two outwardly extending curved wings 61, which secure a lever when the lever is snapped on to lever retaining device 60. Wings 61 flex to let the lever pass over them, and then extend back outwardly to keep the lever from disengaging. Wings 61 can take on any shape or design that would permit them to retain a lever.

Figure 6:
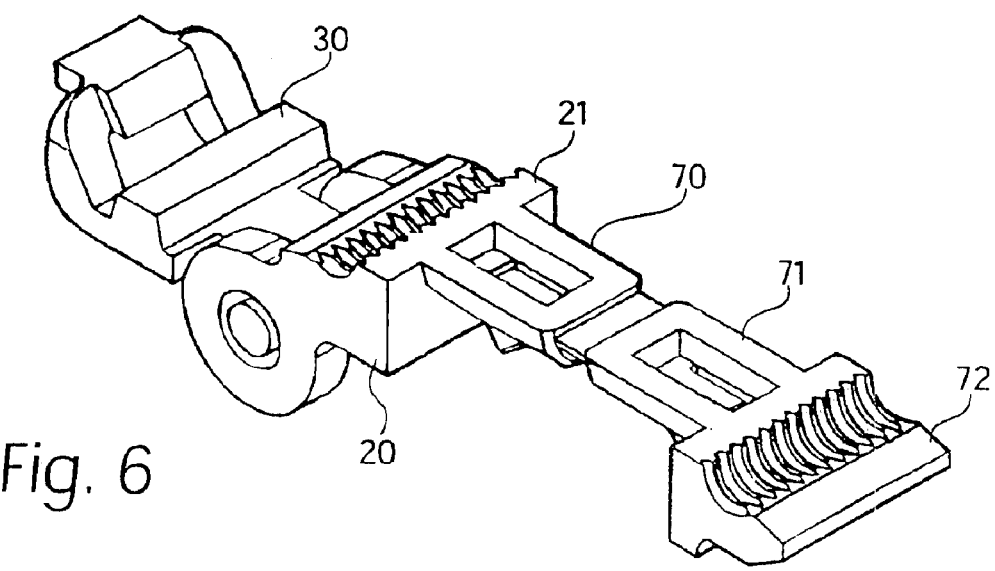
FIG. 6 shows a perspective view of yet another embodiment according to the invention in an open position.
Figure 7:
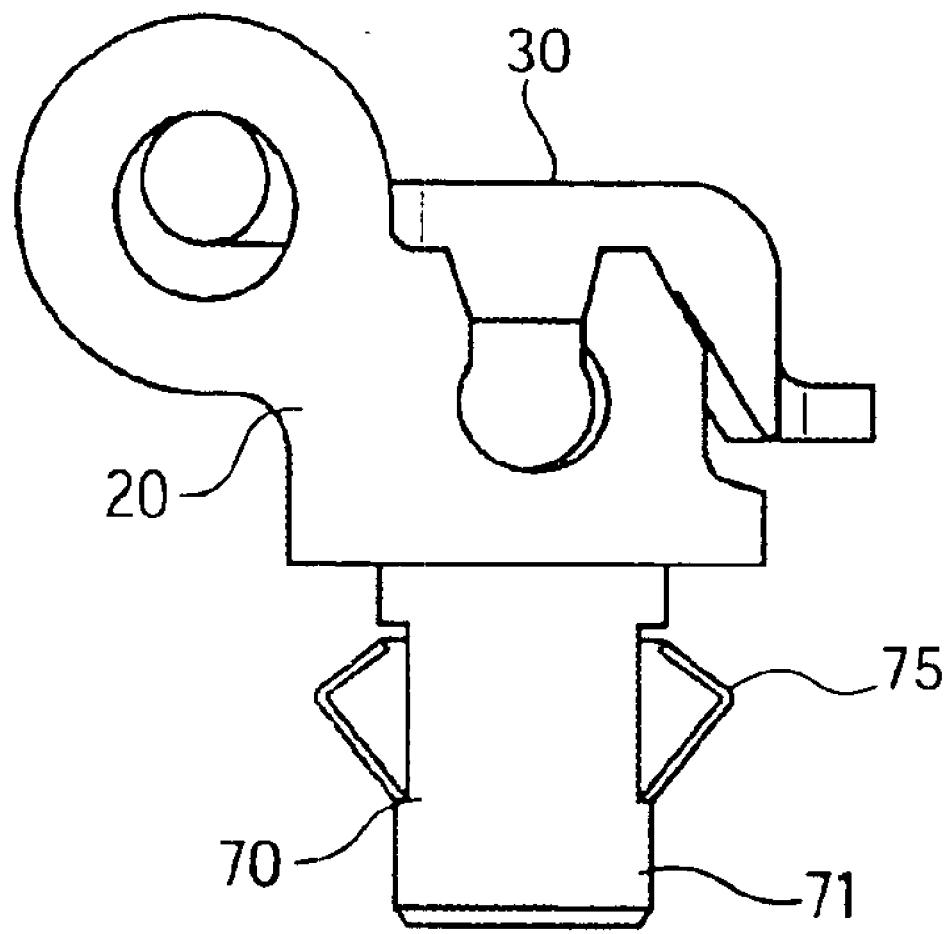
FIG. 7 shows the embodiment of FIG. 6 in a closed position.

FIGS. 6 and 7 show another embodiment of the rod clip 10, in which the lever retaining device is formed by an extension of first portion 20, the extension comprising a first leg 70, a second leg 71 pivotally and integrally connected to first leg 70 and an end section 72, such that folding second leg 71 over first leg 70 forms the lever retaining device and causes end section 72 to abut the top 21 surface of first portion 20. Latches 75 are disposed on each of first and second legs 71 to retain a lever snapped thereon. Second section 30 is then snapped over and secures end section 72 to rod clip 10, as shown in FIG. 7. As with FIGS. 1–4, the rod-retaining tabs 45 can also be present in these embodiments if desired.

Accordingly, while only a few embodiments of the present invention have been shown and described, it is obvious that many changes and modifications may be made thereunto without departing from the spirit and scope of the invention.

What is claimed is:

1. A rod clip comprising:
   a first portion having a top surface with a recess and a bottom surface,
   a second portion hinged to the first portion, said second portion having a top surface and a bottom surface, wherein folding the second portion over the first portion forms a channel for retaining the rod;
   a lever retaining device disposed on one of the first and second portions; and
   four rod-retaining tabs, two tabs being disposed opposing each other on one end of said recess and two tabs being disposed opposing each other on another end of said recess, a top portion of said tabs protruding into a space above the recess, so that a rod can be snapped into said recess over said tabs and retained in said recess until the second portion is folded over the first portion.

2. The rod clip according to claim 1, wherein the hinge is formed by apertures on sides of one of the first and second portions and corresponding protrusions on the other of the first and second portions, said protrusions extending into the apertures to allow pivoting of the first and second portions with respect to each other.

3. The rod clip according to claim 1, wherein the areas of the first and second portions that form the channel are threaded so as to securely retain a correspondingly threaded rod.

4. The rod clip according to claim 1, wherein the locking device comprises a latch on one of the first and second portions, and a recess on the other of said first and second portions, wherein said latch snaps into said recess to lock the first and second portions together.

5. The rod clip according to claim 1, wherein the lever retaining device comprises a protrusion extending below the bottom surface of one of said first and second portions.

6. The rod clip according to claim 5, wherein the protrusion comprises a cylinder having latches to engage a lever.

7. The rod clip according to claim 5, wherein the protrusion includes wings extending outward from the protrusion to engage a lever.

8. The rod clip according to claim 1, wherein the rod clip is produced already assembled in a one-step injection molding process.

9. The rod clip according to claim 1, wherein there are four rod-retaining tabs, two tabs being disposed opposing each other on one end of said recess and two tabs being disposed opposing each other on another end of said recess, a top portion of said tabs protruding into a space above the recess, so that a rod can be snapped into said recess over said tabs and retained in said recess until the second portion is folded over the first portion.

10. The rod clip according to claim 1, wherein the tabs are integrally formed with the rod clip.

* * * * *